United States Patent
Koo et al.

(10) Patent No.: US 10,171,836 B2
(45) Date of Patent: Jan. 1, 2019

(54) METHOD AND DEVICE FOR PROCESSING VIDEO SIGNAL

(71) Applicant: LG Electronics Inc., Seoul (KR)

(72) Inventors: Moonmo Koo, Seoul (KR); Jiwook Jung, Seoul (KR); Sehoon Yea, Seoul (KR); Jin Heo, Seoul (KR); Taesup Kim, Seoul (KR); Jaewon Sung, Seoul (KR); Eunyong Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 251 days.

(21) Appl. No.: 14/433,773

(22) PCT Filed: Oct. 4, 2013

(86) PCT No.: PCT/KR2013/008864
§ 371 (c)(1),
(2) Date: Apr. 6, 2015

(87) PCT Pub. No.: WO2014/054896
PCT Pub. Date: Apr. 10, 2014

(65) Prior Publication Data
US 2015/0281734 A1    Oct. 1, 2015

Related U.S. Application Data

(60) Provisional application No. 61/710,759, filed on Oct. 7, 2012.

(51) Int. Cl.
*H04N 19/597* (2014.01)
*H04N 13/00* (2018.01)
(Continued)

(52) U.S. Cl.
CPC ......... *H04N 19/597* (2014.11); *H04N 13/161* (2018.05); *H04N 19/43* (2014.11); *H04N 19/436* (2014.11); *H04N 19/52* (2014.11)

(58) Field of Classification Search
CPC ... H04N 19/597; H04N 19/52; H04N 13/0048
(Continued)

(56) References Cited

U.S. PATENT DOCUMENTS

| | | | |
|---|---|---|---|
| 2010/0166073 | A1 | 7/2010 | Schmit et al. |
| 2012/0269269 | A1* | 10/2012 | Choi .................... H04N 19/597 375/240.16 |
| 2013/0287108 | A1* | 10/2013 | Chen .................... H04N 19/597 375/240.16 |

FOREIGN PATENT DOCUMENTS

| | | |
|---|---|---|
| JP | 2008-154072 A1 | 7/2008 |
| JP | 2012-191298 A | 10/2012 |

(Continued)

OTHER PUBLICATIONS

Heiko Schwarz et al., "3D-HEVC-CE3 results on inter-view motion parameter prediction by HHI", 99, MPEG Meeting; Feb. 2012, San Jose, USA, ISO/IEC JTC1/SC29/WG11, M23698, XP030052223, the whole document.

(Continued)

*Primary Examiner* — On S Mung
(74) *Attorney, Agent, or Firm* — Dentons US LLP (57) ABSTRACT

According to the present invention, an inter-view motion vector of a current coding unit is acquired using parallel processing information, and a motion vector of a current prediction unit in the current coding unit is acquired in parallel using the inter-view motion vector of the current coding unit. The present invention relates to a method and device for processing a video signal, wherein a motion vector prediction value of the current prediction unit is acquired by comparing output order information of a reference picture corresponding to the current prediction unit and output order information of a reference picture corresponding to a corresponding block. According to the present invention, through a parallel processing step, a multi-view (Continued)

point video image can be quickly restored, and the accuracy of the motion vector prediction value can be increased using motion information corresponding to the reference picture of the corresponding block of a different view point from the current prediction unit.

12 Claims, 9 Drawing Sheets (51) Int. Cl.
*H04N 19/52* (2014.01)
*H04N 13/161* (2018.01)
*H04N 19/43* (2014.01)
*H04N 19/436* (2014.01)

(58) Field of Classification Search
USPC .................................................. 375/240.16
See application file for complete search history.

(56) References Cited

FOREIGN PATENT DOCUMENTS

| JP | 2015-515227 A | 5/2015 |
|---|---|---|
| KR | 10-2008-0060188 A1 | 7/2008 |
| KR | 10-0846780 B1 | 7/2008 |
| KR | 10-2009-0129412 A1 | 12/2009 |
| WO | 2013/159038 A1 | 10/2013 |

OTHER PUBLICATIONS

Nikolce Stefanoski et al., "Description of 3D Video Coding Technology Proposal by Disney Research Zurich and Fraunhofer HHI", 98, MPEG Meeting, Nov. 2011, Geneva, ISO/IEC JTC1/SC29/WG11, MPEG 2011/M22668, XP030051231, Section 3.2.

Jaewon Sung et al., "3D-CE5.h: Simplification of disparity vector derivation for HEVC-based 3D video coding", 1st Meeting: Stockholm, SE, Jul. 16-20, 2012, Joint Collaborative Team on 3D Video Coding Extension Development of ITU-T SG 16 WP 3 and ISO/IEC JTC 1/SC 29/WG 11, JCT2-A0126, XP030130125, the whole document.

Minhua: "Parallelized merge/skip mode for HEVC", Joint Collaborative Team on Video Coding (JCT-VC) of ITU-T SG16 WP3 and ISO/IEC JTC1/SC29/WG 11, 6th Meeting, Torino, IT, Jul. 14-22, 2011.

Yunfei, et al: "Non-CE9: Simplified Merge candidate derivation", Joint Collaborative Team on Video Coding (JCT-VC) of ITU-T SG16 WP3 and ISO/IEC JTC1/SC29/WG 11, 6th Meeting, Geneva, CH, Nov. 21-30, 2011.

Yongjoon, et al., "Parallel Merge Candidate Derivation for Inter NxN partition type", Joint Collaborative Team on Video Coding (JCT-VC) of ITU-T SG16 WP3 and ISO/IEC JTC1/SC29/W2G 11, 8th Meeting, San Jose, CA, USA, Feb. 1-10, 2012.

Yunfei Zheng et al., "AHG10: Hooks related to motion for the 3DV extension of HEVC", Joint Collaborative Team on Video Coding (JCT-VC) of ITU-T SG16 WP3 and ISO/IEC JTC1/SC29/WG11 JCTVC-J0122, ITU-T, Jul. 20, 2012, p. 1-20.

\* cited by examiner

METHOD AND DEVICE FOR PROCESSING VIDEO SIGNAL

This application is a National Stage Entry of International Application No. PCT/KR2013/008864 filed Oct. 4, 2013, and claims the benefit of U.S. Provisional Application No. 61/710,759 filed Oct. 7, 2012, both of which are hereby incorporated by reference for all purposes as if fully set forth herein in their entireties.

TECHNICAL FIELD

The present invention relates to a method and device for processing a video signal.

BACKGROUND ART

Compression refers to a signal processing technique for transmitting digital information through a communication line or storing the digital information in a form suitable for a storage medium. Compression targets include audio, video and text information. Particularly, a technique of compressing images is called video compression. Multiview video has characteristics of spatial redundancy, temporal redundancy and inter-view redundancy.

DISCLOSURE

Technical Problem

An object of the present invention is to improve video signal coding efficiency.

Technical Solution

The present invention can obtain an inter-view motion vector of a current coding unit using parallel processing information in a multiview video image and acquire motion vectors of current prediction units in parallel using the inter-view motion vector of the current coding unit.

The present invention can acquire a motion vector prediction value of a current prediction unit by comparing a picture order count of a reference picture corresponding to the current prediction unit with a picture order count of a reference picture of a corresponding block.

The present invention can acquire the motion vector prediction value of the current prediction unit using motion information corresponding to the reference picture of the corresponding block when the picture order count of the reference picture corresponding to the current prediction unit is identical to the picture order count of the reference picture of the corresponding block.

The present invention can acquire the motion vector prediction value of the current prediction unit using the picture order count of the reference picture corresponding to the current prediction unit, the picture order count of the reference picture of the corresponding block and motion information corresponding to the reference picture of the corresponding block when the picture order count of the reference picture corresponding to the current prediction unit is not identical to the picture order count of the reference picture of the corresponding block.

Advantageous Effects

The present invention can rapidly restore a video image by obtaining an inter-view motion vector of a current coding unit and a motion vector of a current prediction unit through parallel processing in a multiview video image.

The present invention can acquire a correct motion vector prediction value using motion information corresponding to a reference picture of a corresponding block of a different view from the current prediction unit.

BEST MODE

The present invention provides a method and a device for processing a video signal, which acquire an inter-view motion vector of a current coding unit included in a current parallel processing unit using an inter-view motion vector of a neighboring block corresponding to the current coding unit and acquire motion vectors of one or more current prediction units in parallel using the inter-view motion vector of the current coding unit, wherein a size of the current parallel processing unit is determined using parallel processing information, and the neighboring block corresponding to the current coding unit is included in a parallel processing unit adjacent to the current parallel processing unit, wherein the current coding unit includes the one or more current prediction units.

The parallel processing unit adjacent to the current parallel processing unit may be at least one of a left-bottom parallel processing unit, a left parallel processing unit, a left-top parallel processing unit, a top parallel processing unit and a right-top parallel processing unit of the current parallel processing unit.

When the current coding unit has a size of 2N×2N, each current prediction unit has a size of N×N and the current prediction units are processed in parallel, the current prediction units may include a first prediction unit, a second prediction unit, a third prediction unit and a fourth prediction unit, wherein a motion vector prediction value of the first prediction unit is acquired using motion information of a left-top block, a top block, a right-top block, a left block and a left-bottom block of the first prediction unit, a motion vector prediction value of the second prediction unit is acquired using motion information of a left-top block, a top block and a right-top block of the second prediction unit, a motion vector prediction value of the third prediction unit is acquired using motion information of a left-top block, a left block and a left-bottom block of the third prediction unit, and a motion vector prediction value of the fourth prediction unit is acquired using motion information of a right-top block and a left-bottom block of the fourth prediction unit.

When the current coding unit has a size of 2N×2N, each current prediction unit has a size of N×2N and the current prediction units are processed in parallel, the current prediction units may include a fifth prediction unit and a sixth prediction unit, wherein a motion vector prediction value of the fifth prediction unit is acquired using motion information of a left-top block, a top block, a right-top block, a left block and a left-bottom block of the fifth prediction unit, and a motion vector prediction value of the sixth prediction unit is acquired using motion information of a left-top block, a top block, a right-top block and a left-bottom block of the sixth prediction unit.

When the current coding unit has a size of 2N×2N, each current prediction unit has a size of 2N×N and the current prediction units are processed in parallel, the current prediction units may include a seventh prediction unit and an eighth prediction unit, wherein a motion vector prediction value of the seventh prediction unit is acquired using motion information of a left-top block, a top block, a right-top block, a left block and a left-bottom block of the seventh prediction unit, and a motion vector prediction value of the eighth prediction unit is acquired using motion information of a left-top block, a right-top block, a left block and a left-bottom block of the eighth prediction unit.

The method for processing a video signal according to the present invention may include: obtaining information on a picture order count of a reference picture corresponding to the current prediction unit; obtaining information on picture order counts of reference pictures of a corresponding block using the inter-view motion vector; comparing the picture order counts of the reference pictures of the corresponding block with the picture order count of the reference picture corresponding to the current prediction unit; and obtaining a motion vector prediction value of the current prediction unit on the basis of a comparison result, wherein the reference picture corresponding to the current prediction unit is positioned at the same view as the current prediction unit and at a different time from the current prediction unit, the corresponding block is positioned at a different view from the current prediction unit and at the same time as the current prediction unit, and the reference pictures of the corresponding block are positioned at the same view as the corresponding block and at a different time from the corresponding block.

When the neighboring block is an inter-view prediction block and the picture order counts of the reference pictures of the corresponding block are identical to the picture order count of the reference picture corresponding to the current picture unit in the obtaining of the motion vector prediction value of the current prediction unit, the motion vector prediction value of the current prediction unit may be acquired using motion vectors corresponding to the reference pictures of the corresponding block.

When the neighboring block is an inter-view prediction block and the picture order counts of the reference pictures of the corresponding block differ from the picture order count of the reference picture corresponding to the current picture unit in the obtaining of the motion vector prediction value of the current prediction unit, the motion vector prediction value of the current prediction unit may be acquired using the picture order counts of the reference pictures of the corresponding block, the picture order count of the reference picture corresponding to the current prediction unit and the motion vectors corresponding to the reference pictures of the corresponding block.

When the neighboring block is a reference view temporal inter prediction block and the picture order counts of the reference pictures of the corresponding block are identical to the picture order count of the reference picture corresponding to the current picture unit in the obtaining of the motion vector prediction value of the current prediction unit, the motion vector prediction value of the current prediction unit may be acquired using the motion vectors corresponding to the reference pictures of the corresponding block.

MODES FOR INVENTION

Techniques for compressing or decoding multiview video signal data consider spatial redundancy, temporal redundancy and inter-view redundancy. In the case of a multiview image, multiview texture images captured at two or more views can be coded in order to generate a three-dimensional image. Furthermore, depth data corresponding to the multiview texture images may be coded as necessary. The depth data can be compressed in consideration of spatial redundancy, temporal redundancy or inter-view redundancy. Depth data is information on the distance between a camera and a corresponding pixel. The depth data can be flexibly interpreted as depth related information such as depth information, a depth image, a depth picture, a depth sequence and a depth bitstream in the specification. In addition, coding can include both the concepts of encoding and decoding in the specification and can be flexibly interpreted within the technical spirit and technical scope of the present invention.

Figure 1:
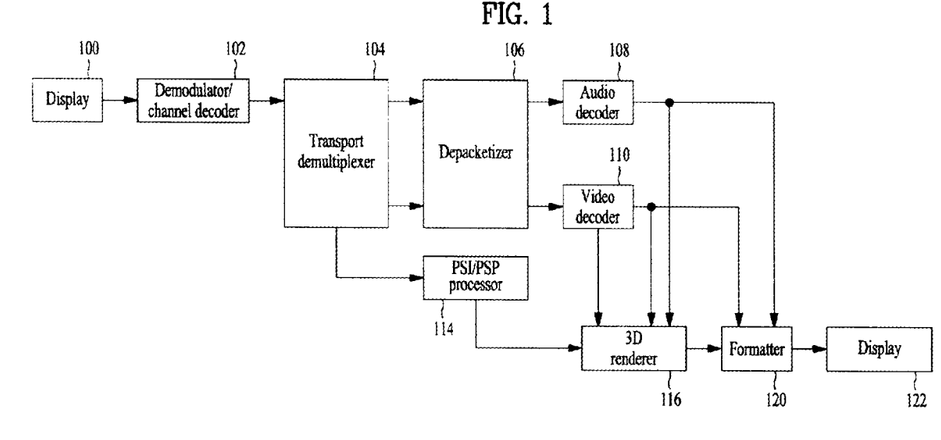
FIG. 1 is a block diagram of a broadcast receiver to which depth coding is applied according to an embodiment of the present invention.

FIG. 1 is a block diagram of a broadcast receiver to which depth coding is applied according to an embodiment to which the present invention is applied.

The broadcast receiver according to the present embodiment receives terrestrial broadcast signals to reproduce images. The broadcast receiver can generate three-dimensional content using received depth related information. The broadcast receiver includes a tuner 100, a demodulator/channel decoder 102, a transport demultiplexer 104, a depacketizer 106, an audio decoder 108, a video decoder 110, a PSI/PSIP processor 114, a 3D renderer 116, a formatter 120 and a display 122.

The tuner 100 selects a broadcast signal of a channel tuned by a user from among a plurality of broadcast signals input through an antenna (not shown) and outputs the selected broadcast signal. The demodulator/channel decoder 102 demodulates the broadcast signal from the tuner 100 and performs error correction decoding on the demodulated signal to output a transport stream TS. The transport demultiplexer 104 demultiplexes the transport stream so as to divide the transport stream into a video PES and an audio PES and extract PSI/PSIP information. The depacketizer 106 depacketizes the video PES and the audio PES to restore a video ES and an audio ES. The audio decoder 108 outputs an audio bitstream by decoding the audio ES. The audio bitstream is converted into an analog audio signal by a digital-to-analog converter (not shown), amplified by an amplifier (not shown) and then output through a speaker (not shown). The video decoder 110 decodes the video ES to restore the original image. The decoding processes of the audio decoder 108 and the video decoder 110 can be performed on the basis of a packet ID (PID) confirmed by the PSI/PSIP processor 114. During the decoding process, the video decoder 110 can extract depth information. In addition, the video decoder 110 can extract additional information necessary to generate an image of a virtual camera view, for example, camera information or information for estimating an occlusion hidden by a front object (e.g. geometrical information such as object contour, object transparency information and color information), and provide the additional information to the 3D renderer 116. However, the depth information and/or the additional information may be separated from each other by the transport demultiplexer 104 in other embodiments of the present invention.

The PSI/PSIP processor 114 receives the PSI/PSIP information from the transport demultiplexer 104, parses the PSI/PSIP information and stores the parsed PSI/PSIP information in a memory (not shown) or a register so as to enable broadcasting on the basis of the stored information. The 3D renderer 116 can generate color information, depth information and the like at a virtual camera position using the restored image, depth information, additional information and camera parameters.

In addition, the 3D renderer 116 generates a virtual image at the virtual camera position by performing 3D warping using the restored image and depth information regarding the restored image. While the 3D renderer 116 is configured as a block separated from the video decoder 110 in the present embodiment, this is merely an exemplary and the 3D renderer 116 may be included in the video decoder 110.

The formatter 120 formats the image restored in the decoding process, that is, the actual image captured by a camera, and the virtual image generated by the 3D renderer 116 according to the display mode of the broadcast receiver such that a 3D image is displayed through the display 122. Here, synthesis of the depth information and virtual image at the virtual camera position by the 3D renderer 116 and image formatting by the formatter 120 may be selectively performed in response to a user command. That is, the user may manipulate a remote controller (not shown) such that a composite image is not displayed and designate an image synthesis time.

As described above, the depth information for generating the 3D image is used by the 3D renderer 116. However, the depth information may be used by the video decoder 110 in other embodiments. A description will be given of various embodiments in which the video decoder 110 uses the depth information.

Figure 2:
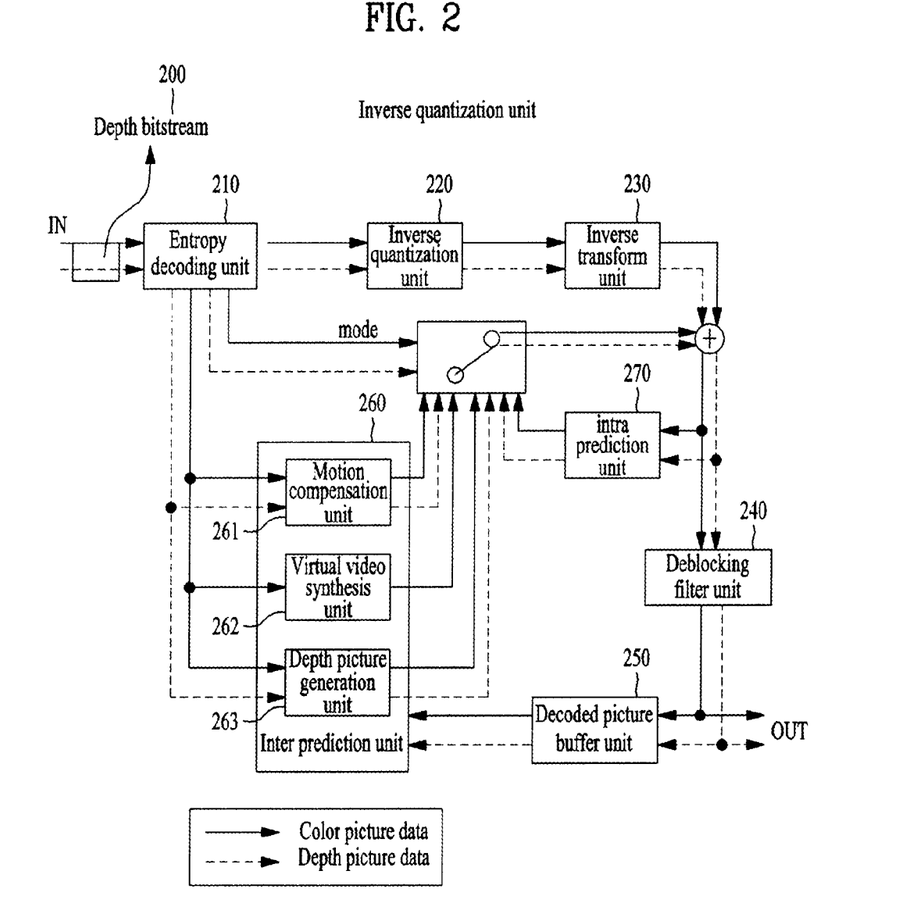
FIG. 2 is a block diagram of a video decoder according to an embodiment of the present invention.

FIG. 2 is a block diagram of the video decoder according to an embodiment to which the present invention is applied.

Referring to FIG. 2, the video decoder 110 may include an entropy decoding unit 210, an inverse quantization unit 220, an inverse transform unit 230, a deblocking filter unit 240, a decoded picture buffer unit 250, an inter prediction unit 260 and an intra prediction unit 270. In FIG. 2, solid lines represent flow of color picture data and dotted lines represent flow of depth picture data. While the color picture data and the depth picture data are separately represented in FIG. 2, separate representation of the color picture data and the depth picture data may refer to separate bitstreams or separate flows of data in one bitstream. That is, the color picture data and the depth picture data can be transmitted as one bitstream or separate bitstreams. FIG. 2 only shows data flows and does not limit operations to operation performed in one decoder.

First of all, to decode a received depth bitstream 200, the depth bitstream 200 is parsed per NAL. Here, various types of attribute information regarding depth may be included in an NAL header region, an extended region of the NAL header, a sequence header region (e.g. sequence parameter set), an extended region of the sequence header, a picture header region (e.g. picture parameter set), an extended region of the picture header, a slice header region, an extended region of the slice header, a slice data region or a macro block region. While depth coding may be performed using a separate codec, it may be more efficient to add attribute information regarding depth only in the case of depth bitstream if compatibility with existing codecs is achieved. For example, depth identification information for identifying a depth bitstream can be added to the sequence header region (e.g. sequence parameter set) or the extended region of the sequence header. Attribute information regarding a depth sequence can be added only when an input bitstream is a depth coded bitstream, according to the depth identification information.

The parsed depth bitstream 200 is entropy-decoded through the entropy decoding unit 210 and a coefficient, a motion vector and the like of each macro block are extracted. The inverse quantization unit 220 multiplies a received quantized value by a predetermined constant so as to obtain a transformed coefficient and the inverse transform unit 230 inversely transforms the coefficient to restore depth information of a depth picture. The intra prediction unit 270 performs intra prediction using the restored depth information of the current depth picture. The deblocking filter unit 240 applies deblocking filtering to each coded macro block in order to reduce block distortion. The deblocking filter unit improves the texture of a decoded frame by smoothing edges of blocks. A filtering process is selected depending on boundary strength and an image sample gradient around a boundary. Filtered depth pictures are output or stored in the decoded picture buffer unit 250 to be used as reference pictures.

The decoded picture buffer unit 250 stores or opens previously coded depth pictures for inter prediction. Here, to store coded depth pictures in the decoded picture buffer unit 250 or to open stored coded depth pictures, frame_num and POC (Picture Order Count) of each picture are used. Since the previously coded pictures may include depth pictures corresponding to views different from the current depth picture, depth view information for identifying views of depth pictures as well as frame_num and POC can be used in order to use the previously coded pictures as reference pictures in depth coding.

In addition, the decoded picture buffer unit 250 may use the depth view information in order to generate a reference picture list for inter-view prediction of depth pictures. For example, the decoded picture buffer unit 250 can use depth-view reference information. The depth-view reference information refers to information used to indicate dependence between views of depth pictures. For example, the depth-view reference information may include the number of depth views, a depth view identification number, the number of depth-view reference pictures, depth view identification numbers of depth-view reference pictures and the like.

The decoded picture buffer unit 250 manages reference pictures in order to implement more flexible inter prediction. For example, a memory management control operation method and a sliding window method can be used. Reference picture management unifies a reference picture memory and a non-reference picture memory into one memory and manages the unified memory so as to achieve efficient management with a small-capacity memory. In depth coding, depth pictures can be separately marked to be discriminated from color pictures in the decoded picture buffer unit and information for identifying each depth picture can be used in the marking process. Reference pictures managed through the aforementioned procedure can be used for depth coding in the inter prediction unit 260.

Referring to FIG. 2, the inter prediction unit 260 may include a motion compensation unit 261, a virtual view synthesis unit 262 and a depth picture generation unit 263.

The motion compensation unit 261 compensates for motion of the current block using information transmitted from the entropy decoding unit 210. The motion compensation unit 261 extracts motion vectors of neighboring blocks of the current block from a video signal and acquires a motion vector prediction value of the current block. The motion compensation unit 261 compensates for motion of the current block using the motion vector prediction value and a differential vector extracted from the video signal. Motion compensation may be performed using one reference picture or a plurality of pictures. In depth coding, motion compensation can be performed using information on a reference picture list for inter-view prediction of depth pictures stored in the decoded picture buffer unit 250 when the current depth picture refers to a depth picture of a different view. Further, motion compensation may be performed using depth view information for identifying the view of the depth picture.

The virtual view synthesis unit 262 synthesizes a color picture of a virtual view using color pictures of neighboring views of the view of the current color picture. To use the color pictures of the neighboring views or to use color pictures of a desired specific view, view identification information indicating the views of the color pictures can be used. When the color picture of the virtual view is generated, flag information indicating whether the color picture of the virtual view is generated can be defined. When the flag information indicates generation of the color picture of the virtual view, the color picture of the virtual view can be generated using the view identification information. The color picture of the virtual view, acquired through the virtual view synthesis unit 262, may be used as a reference picture. In this case, the view identification information can be assigned to the color picture of the virtual view.

In another embodiment, the virtual view synthesis unit 262 can synthesize a depth picture of a virtual view using depth pictures corresponding to neighboring views of the view of the current depth picture. In this case, depth view identification information indicating the view of a depth picture can be used. Here, the depth view identification information can be derived from view identification information of a corresponding color picture. For example, the corresponding color picture can have the same picture output order information and the same view identification information as those of the current depth picture.

The depth picture generation unit 263 can generate the current depth picture using depth coding information. Here, the depth coding information may include a distance parameter indicating a distance between a camera and an object (e.g. a Z-coordinate value on a camera coordinate system or the like), macro block type information for depth coding, information for identifying a boundary in a depth picture, information indicating whether data in RBSP includes depth-coded data, information indicating whether a data type is depth picture data, color picture data or parallax data and the like. In addition, the current depth picture may be predicted using the depth coding information. That is, inter prediction using neighboring depth pictures of the current depth picture can be performed and intra prediction using decoded depth information in the current depth picture can be performed.

In the present invention, "unit" can refer to a block, a sub-block, a macro block, a slice, a picture, a frame, a picture group, a sequence, etc. when applied to a video signal. Accordingly, the meaning of "unit" should be interpreted according to application thereof. Furthermore, when the unit is applied to a signal other than the video signal, the unit may be interpreted as having a meaning suitable for the signal. A coding unit refers to a basic unit in a video signal processing procedure. The coding unit may not have a fixed size in video processing. A prediction unit refers to a basic unit for prediction. The prediction unit can have a size of a square form (2N×2N or N×N) or a size of a rectangular form (2N×N or N×2N). The size of the prediction unit may be identical to or smaller than the coding unit. The coding unit may be segmented into a plurality of prediction units. In addition, a current unit can be defined as including a current coding unit and a current prediction unit in the present invention.

A description will be given of a method for obtaining inter-view motion vectors of current units in parallel using parallel processing information and obtaining motion vectors of current prediction units using the inter-view motion vectors. In the present invention, parallel processing may refer to simultaneous coding of a plurality of units.

Figure 3:
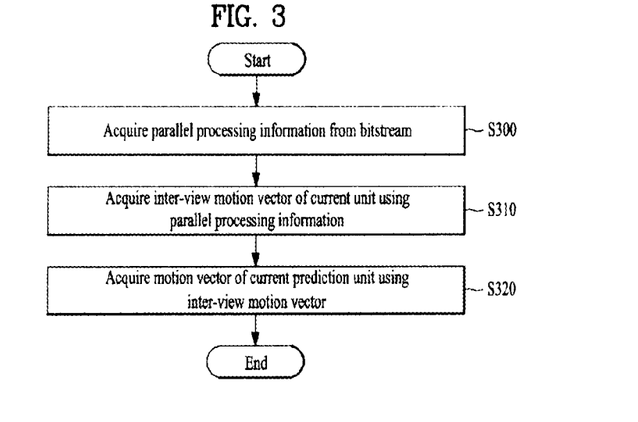
FIG. 3 is a flowchart illustrating a method for obtaining an inter-view motion vector of a current unit using parallel processing information and obtaining a motion vector of a current prediction unit according to an embodiment of the present invention.

FIG. 3 is a flowchart illustrating a method for obtaining inter-view motion vectors of current units in parallel using parallel processing information and obtaining motion vectors of current prediction units.

The parallel processing information can be acquired from a bitstream (S300). The parallel processing information may indicate whether parallel processing is performed and include information about the size of a parallel processing unit. Here, the parallel processing unit may refer to a basic unit to which parallel processing is applied. The parallel processing information may be acquired per picture, frame, picture group or sequence.

Inter-view motion vectors of current units can be acquired using the parallel processing information (S310). Whether parallel processing is applied to a highest current coding unit can be determined through the parallel processing information. Here, the highest current coding unit is a coding unit including a current coding unit, and the current coding unit can be acquired through segmentation of the highest current coding unit. If parallel processing is applied to the highest current coding unit and the size of the parallel processing unit is determined, an inter-view motion vector of the current coding unit included in the highest current coding unit can be acquired using inter-view motion vectors of neighboring blocks of the current coding unit. The neighboring blocks of the current coding unit are included in a parallel processing unit adjacent to a current parallel processing unit including the current coding unit. The parallel processing unit adjacent to the current parallel processing unit may be at least one of a left-bottom parallel processing unit, a left parallel processing unit, a left-top parallel processing unit, a top parallel processing unit and a right-top parallel processing unit of the current parallel processing unit. An example of obtaining the inter-view motion vector of the current coding unit will be described in detail with reference to FIG. 4.

The current coding unit may include current prediction units. Inter-view motion vectors of the current prediction units can be acquired using the acquired inter-view motion vector of the current coding unit. Alternatively, the inter-view motion vectors of the current prediction units may be acquired using inter-view motion vectors of neighboring blocks of the current prediction units.

Motion vectors of the current prediction units can be acquired in parallel using the inter-view motion vector of the current coding unit (S320). Here, the motion vectors of the current prediction units can be acquired using motion information of neighboring blocks of the current prediction units. An example of parallel processing of the current prediction units included in the current coding unit will be described with reference to FIGS. 5, 6 and 7 and an example of obtaining the motion vectors of the current prediction units using the inter-view motion vector of the current coding unit will be described with reference to FIGS. 8, 9 and 10.

A description will be given of an example of obtaining the inter-view motion vector of the current coding unit using the parallel processing information.

Figure 4:
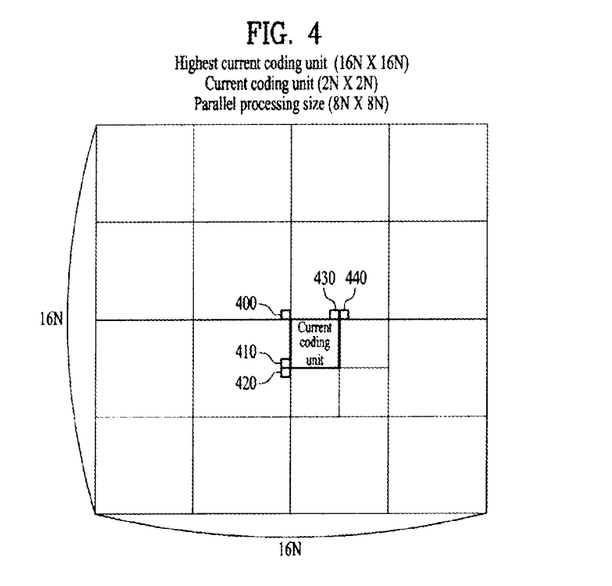
FIG. 4 illustrates an example of obtaining an inter-view motion vector of a current coding unit using parallel processing information according to an embodiment of the present invention.

FIG. 4 illustrates an example of obtaining the inter-view motion vector of the current coding unit using the parallel processing information according to an embodiment of the present invention.

When the block to which parallel processing is applied includes the current coding unit, as described in S310, the inter-view motion vector of the current coding unit can be acquired using inter-view motion vectors of neighboring blocks.

FIG. 4 shows an example in which the highest current coding unit has a size of 16N×16N, the current coding unit has a size of 2N×2N and the parallel processing block has a size of 8N×8N. The inter-view motion vector of the current coding unit can be acquired using inter-view motion vectors of neighboring units which are not processed simultaneously with the current coding unit. For example, the inter-view motion vector of the current coding unit can be acquired using inter-view motion vectors of a left-top block 400, a left block 410 and a left-bottom block 420 of the current coding unit. Alternatively, the inter-view motion vector of the current coding unit may be acquired using only the inter-view motion vector of the left block 410 of the current coding unit. When neighboring blocks of the current coding unit are inter-view inter-prediction blocks or reference view temporal inter-prediction blocks which are coded using inter-view motion vectors, the inter-view motion vector of the current coding unit can be acquired using the inter-view motion vectors of the neighboring blocks.

While a top block 430 and a right-top block 440 of the current coding unit are neighboring blocks of the current coding unit, the top block 430 and the right-top block 440 are included in a unit which is processed simultaneously with the current coding unit. Accordingly, the top block 430 and the right-top block 440 are not used for the procedure of obtaining the inter-view motion vector of the current coding unit.

Inter-view motion vectors of all coding units included in the current highest coding unit can be acquired using the aforementioned method.

A description will be given of an example of parallel processing of current prediction units included in the current coding unit.

Figure 5:
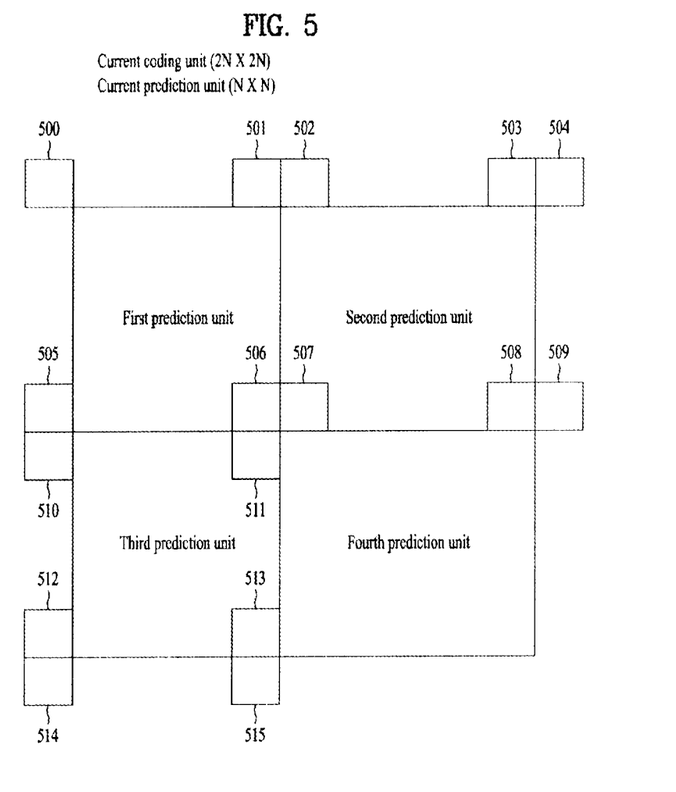
FIG. 5 illustrates an example of processing current prediction units in a current coding unit in parallel in units of N×N according to an embodiment of the present invention.

FIG. 5 illustrates an example of parallel processing of current prediction units included in the current coding unit in units of N×N according to an embodiment of the present invention.

When the current coding unit has a size of 2N×2N and a current prediction unit included in the current coding unit has a size of N×N, the current coding unit includes four current prediction units and motion vector prediction values of the four current prediction units can be simultaneously acquired using motion vectors of neighboring blocks thereof.

Referring to FIG. 5, the current coding unit includes a first prediction unit, a second prediction unit, a third prediction unit and a fourth prediction unit. Each prediction unit has neighboring blocks thereof.

A motion vector prediction value of the first prediction unit can be acquired using motion vectors of neighboring blocks of the first prediction unit, that is, a left-top block 500, a top block 501, a right-top block 502, a left block 505 and a left-bottom block 510.

A motion vector prediction value of the second prediction unit can be acquired using motion vectors of neighboring blocks of the second prediction unit, that is, a left-top block 501, a top block 503 and a right-top block 504. A left block 506 and a left-bottom block 511 from among the neighboring blocks of the second prediction unit are included in the current coding unit and motion vectors of the left block 506 and the left-bottom block 511 may not be used for parallel processing.

A motion vector prediction value of the third prediction unit can be acquired using motion vectors of neighboring blocks of the third prediction unit, that is, a left-top block 505, a left block 512 and a left-bottom block 514. A top block 506 and a right-top block 507 from among the neighboring blocks of the third prediction unit are included in the current coding unit and motion vectors of the top block 506 and the right-top block 507 may not be used for parallel processing.

A motion vector prediction value of the fourth prediction unit can be acquired using motion vectors of neighboring blocks of the fourth prediction unit, that is, a right-top block 509 and a left-bottom block 515. A left-top block 506, a top block 508 and a left block 513 from among the neighboring blocks of the fourth prediction unit are included in the current coding unit and motion vectors of the left-top block 506, the top block 508 and the left block 513 may not be used for parallel processing.

Figure 6:
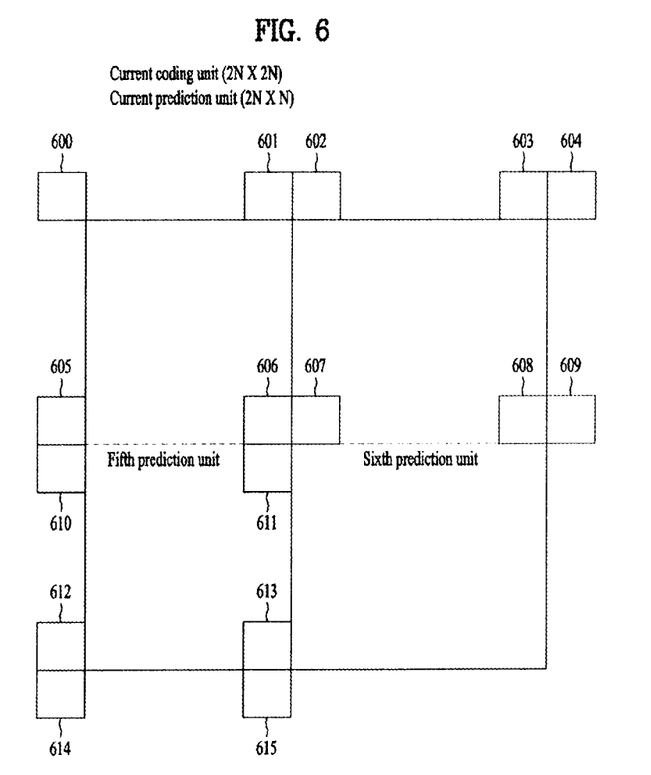
FIG. 6 illustrates an example of processing current prediction units in a current coding unit in parallel in units of 2N×N according to an embodiment of the present invention.

FIG. 6 illustrates an example of parallel processing of current prediction units included in the current coding unit in units of N×2N according to an embodiment of the present invention.

When the current coding unit has a size of 2N×2N and a current prediction unit included in the current coding unit has a size of N×2N, the current coding unit includes two current prediction units and motion vector prediction values of the two current prediction units can be simultaneously acquired using motion vectors of neighboring blocks thereof.

Referring to FIG. 6, the current coding unit includes a fifth prediction unit and a sixth prediction unit. Each prediction unit has neighboring blocks thereof.

A motion vector prediction value of the fifth prediction unit can be acquired using motion vectors of neighboring blocks of the fifth prediction unit, that is, a left-top block 600, a top block 601, a right-top block 602, a left block 605 and a left-bottom block 610.

A motion vector prediction value of the sixth prediction unit can be acquired using motion vectors of neighboring blocks of the sixth prediction unit, that is, a left-top block 601, a top block 603, a right-top block 604 and a left-bottom block 615. A left block 613 from among the neighboring blocks of the sixth prediction unit is included in the current coding unit and the motion vector of the left block 613 may not be used for parallel processing.

Figure 7:
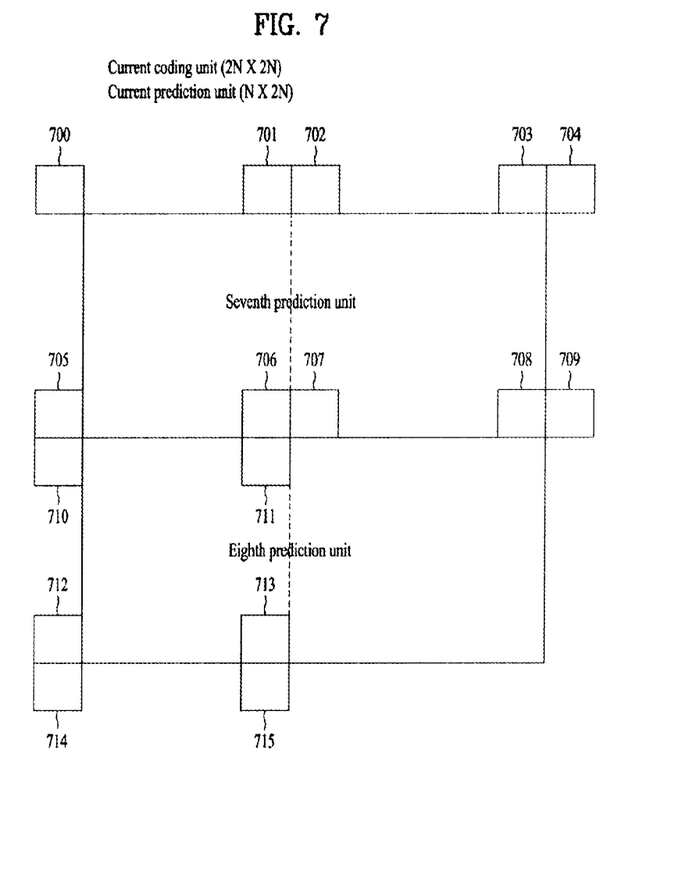
FIG. 7 illustrates an example of processing current prediction units in a current coding unit in parallel in units of N×2N according to an embodiment of the present invention.

FIG. 7 illustrates an example of parallel processing of current prediction units included in the current coding unit in units of 2N×N according to an embodiment of the present invention.

When the current coding unit has a size of 2N×2N and a current prediction unit included in the current coding unit has a size of 2N×N, the current coding unit includes two current prediction units and motion vector prediction values of the two current prediction units can be simultaneously acquired using motion vectors of neighboring blocks thereof.

Referring to FIG. 7, the current coding unit includes a seventh prediction unit and an eighth prediction unit. Each prediction unit has neighboring blocks thereof.

A motion vector prediction value of the seventh prediction unit can be acquired using motion vectors of neighboring blocks of the seventh prediction unit, that is, a left-top block 700, a top block 703, a right-top block 704, a left block 705 and a left-bottom block 710.

A motion vector prediction value of the eighth prediction unit can be acquired using motion vectors of neighboring blocks of the eighth prediction unit, that is, a left-top block 705, a right-top block 709, a left block 712 and a left-bottom block 714. A top block 708 from among the neighboring blocks of the eighth prediction unit is included in the current coding unit and the motion vector of the top block 708 may not be used for parallel processing.

A description will be given of a method for obtaining a motion vector of a current prediction unit using the inter-view motion vector acquired in step S310.

Figure 8:
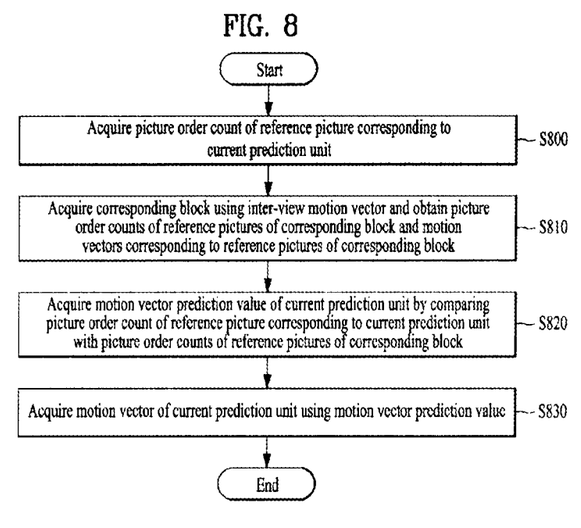
FIG. 8 is a flowchart illustrating a method for obtaining a motion vector prediction value of a current prediction unit using a picture order count of a reference picture corresponding to the current prediction unit, a picture order count of a reference picture of a corresponding block and a motion vector corresponding to the reference picture of the corresponding block according to an embodiment of the present invention.

FIG. 8 is a flowchart illustrating a method for obtaining a motion vector of a current prediction unit using a picture order count and a motion vector corresponding to a reference picture of a corresponding block according to an embodiment of the present invention.

Picture order count information of a reference picture corresponding to the current prediction unit can be acquired (S800). Picture order count information may include information about a picture order count. The picture order count (POC) refers to a picture output order when video is output. When the current prediction unit is coded according to temporal inter prediction, the reference picture corresponding to the current prediction unit can be positioned at the same view as a current picture including the current prediction unit and at a different time from the current picture. Accordingly, pictures at the same view cannot have the same picture order count. A picture order count of a picture including the current prediction unit can be assumed to be POC0 and the picture order count of the reference picture corresponding to the current prediction unit can be assumed to be POC1.

Picture order count information of a reference picture corresponding to a corresponding block and a motion vector corresponding to the reference picture of the corresponding block can be acquired using an inter-view motion vector (S810). The inter-view motion vector of the current prediction unit can be acquired using the inter-view motion vector of the current coding unit, obtained in step S310. A corresponding block of the current prediction unit can be acquired using the inter-view motion vector. The corresponding block can be positioned at a different view from the current prediction unit and at the same time as the current prediction unit.

The picture order count information of the reference picture of the corresponding block and the motion vector corresponding to the reference picture of the corresponding block can be acquired. The corresponding block detected using the inter-view motion vector can be coded according to temporal inter prediction using a plurality of reference pictures. It may be assumed that a picture count order of a reference picture in direction L0, which corresponds to the corresponding block, is POC2L0 and a picture count order of a reference picture in direction L1, which corresponds to the corresponding block, is POC2L1. In addition, it may be assumed that a motion vector corresponding to the L0 direction reference picture of the corresponding block is mv2L0 and a motion vector corresponding to the L1 direction reference picture of the corresponding block is mv2L1.

A motion vector prediction value of the current prediction unit can be acquired by comparing the picture order count of the reference picture corresponding to the current prediction unit with the picture order count of reference pictures of the corresponding block (S820). When the reference picture corresponding to the current prediction unit is in direction L0, the picture order count of the reference picture corresponding to the current prediction unit may be preferentially compared with the picture order count of the L0 direction reference picture of the corresponding block. When the reference picture corresponding to the current prediction unit is in direction L1, the picture order count of the reference picture corresponding to the current prediction unit may be preferentially compared with the picture order count of the L1 direction reference picture of the corresponding block. When the picture order count POC1 of the reference picture corresponding to the current prediction unit is compared with the picture order counts POC2L0 and POC2L1 of the reference pictures of the corresponding block, the picture count orders of the reference pictures of the corresponding block equal or differ from the picture order count of the reference picture corresponding to the current prediction unit. The motion vector of the current prediction unit can be acquired using motion vectors of the reference pictures of the corresponding block on the basis of the comparison result. A method for obtaining the motion vector prediction value of the current prediction unit when the picture order count of a reference picture of the corresponding block is equal to the picture order count of the reference picture corresponding to the current prediction unit will be described with reference to FIG. 9, and a method for obtaining the motion vector prediction value of the current prediction unit when the picture order count of a reference picture of the corresponding block differs from the picture order count of the reference picture corresponding to the current prediction unit will be described with reference to FIG. 10.

The motion vector of the current prediction unit can be acquired using a motion vector prediction value (S830). The motion vector prediction value can be obtained using motion vectors of neighboring blocks of the current prediction unit. One of the motion vectors of the neighboring blocks can be acquired as the motion vector prediction value of the neighboring blocks. Alternatively, the average of the motion vectors of the neighboring blocks may be acquired as the motion vector prediction value of the neighboring block.

The motion vector of the current prediction unit can be acquired using the motion vector prediction value. The motion vector prediction value can be directly used as the motion vector of the current prediction unit. The motion vector prediction value may be included in a motion vector list of the current prediction unit. The motion vector of the current prediction unit can be acquired using priority in the motion vector list or a motion vector index of the current prediction unit.

Figure 9:
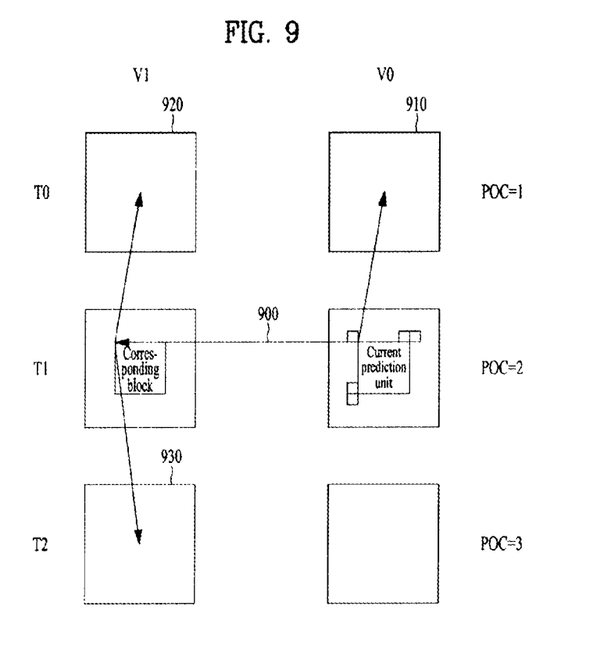
FIG. 9 illustrates an exemplary method for obtaining the motion vector prediction value of the current prediction unit when the picture order count of the reference picture of the corresponding block is identical to the picture order count of the reference picture corresponding to the current prediction unit.

FIG. 9 illustrates an exemplary method for obtaining the motion vector prediction value of the current prediction unit when the picture order count of a reference picture of the corresponding block equal the picture order count of a reference picture corresponding to the current prediction unit.

When the picture order count of a reference picture of the corresponding block equals the picture order count of the reference picture corresponding to the current prediction unit, a motion vector corresponding to the reference picture of the corresponding block, which has the same picture order count as that of the reference picture corresponding to the current prediction unit, can be acquired as the motion vector prediction value of the current prediction unit.

Referring to FIG. 9, a reference picture 910 of the current prediction unit is positioned at the same view as the current prediction unit and at a different time from the current prediction unit. An inter-view motion vector 900 of the current prediction unit can be acquired from neighboring blocks. The inter-view motion vector 900 of the current prediction unit indicates the corresponding block and reference pictures 920 and 930 of the corresponding block are positioned at the same view as the corresponding block and at a different time from the corresponding block.

The picture order count POC1 of the reference picture 910 corresponding to the current prediction unit and the picture order count POC2L2 of the L0-direction reference picture 920 of the corresponding block are identical to each other as 1. Accordingly, the motion vector prediction value of the current prediction unit can be determined as the motion vector mv2L0 corresponding to the L0-direction reference picture 920 of the corresponding block.

Figure 10:
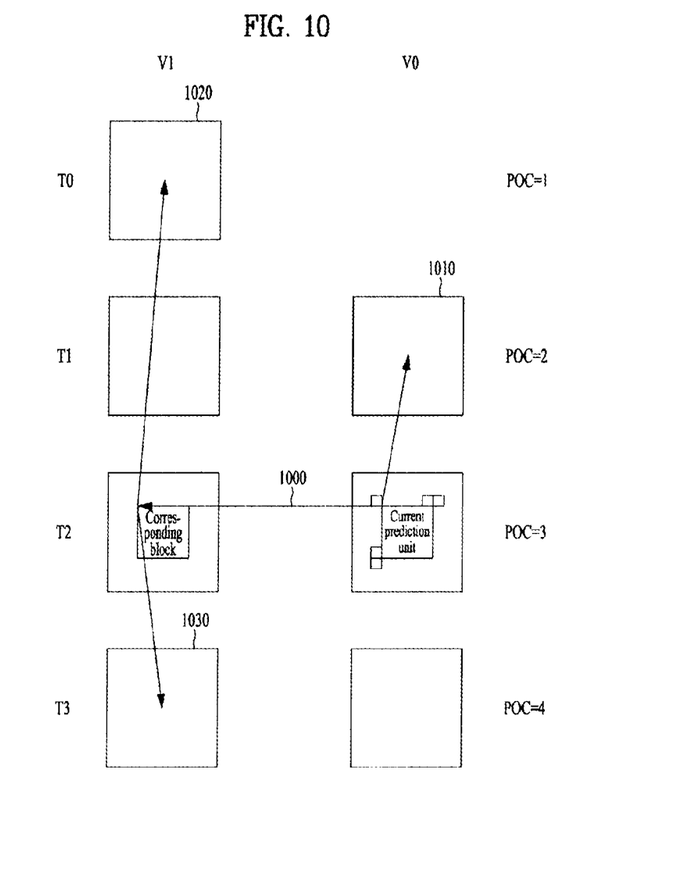
FIG. 10 illustrates an exemplary method for obtaining the motion vector prediction value of the current prediction unit when the picture order count of the reference picture of the corresponding block is different from the picture order count of the reference picture corresponding to the current prediction unit.

FIG. 10 illustrates an exemplary method for obtaining the motion vector prediction value of the current prediction unit when the picture order count of a reference picture of the corresponding block does not equal the picture order count of the reference picture corresponding to the current prediction unit.

When the picture order count of a reference picture of the corresponding block does not equal the picture order count of the reference picture corresponding to the current prediction unit, the motion vector prediction value of the current prediction unit can be acquired by scaling a motion vector corresponding to the reference picture of the corresponding block.

Referring to FIG. 10, a reference picture 1010 of the current prediction unit is positioned at the same view as the current prediction unit and at a different time from the current prediction unit. An inter-view motion vector 1000 of the current prediction unit can be acquired from neighboring blocks. The inter-view motion vector 1000 of the current prediction unit indicates the corresponding block and reference pictures 1020 and 1030 of the corresponding block are positioned at the same view as the corresponding block and at a different time from the corresponding block.

While the picture order count POC1 of the reference picture 1010 corresponding to the current prediction unit is 2, the picture order count POC2L0 of the L0-direction reference picture 1020 of the corresponding block is 1 and the picture order count POC2L1 of the L1-direction reference picture 1030 of the corresponding block is 4. Since the picture order counts of the reference pictures are different, the motion vector prediction value mv1 of the current prediction unit can be acquired by scaling the motion vectors mv2L0 and mv2L1 corresponding to the reference pictures of the corresponding block according to Equation 1.

$$mv1 = mv2LXs\frac{(POC1 - POC0)}{(POC2LX - POC0)} \quad \text{[Equation 1]}$$

In Equation 1, X can be 0 when the direction of a reference picture of the corresponding block is L0 and 1 when the direction is L1.

A description will be given of an exemplary method for obtaining the motion vector prediction value of the current prediction unit according to the method for obtaining the inter-view motion vector of the current prediction unit.

The method for obtaining the motion vector prediction value of the current prediction unit may depend on inter prediction type of a neighboring block from which the inter-view motion vector indicating the corresponding block is acquired. As described in step S810 of FIG. 8, the inter-view motion vector of the current prediction unit can be acquired from neighboring blocks coded according to inter-view inter prediction or neighboring blocks coded according to reference view temporal inter prediction. Neighboring blocks coded according to inter-view inter prediction can provide an inter-view motion vector with higher accuracy than neighboring blocks coded according to reference view temporal inter prediction.

Accordingly, when the inter-view motion vector of the current prediction unit is acquired from neighboring blocks coded by inter-view inter prediction, the motion vector prediction value of the current prediction unit can be acquired using the method described above with reference to FIG. 9 if the picture order count of a reference picture of the corresponding block equals the picture order count of a reference picture corresponding to the current prediction unit and obtained using the method described above with reference to FIG. 10 if the picture order count of the reference picture of the corresponding block differs from the picture order count of the reference picture corresponding to the current prediction unit.

However, when the inter-view motion vector of the current prediction unit is acquired from neighboring blocks coded by reference view temporal inter prediction, the motion vector prediction value of the current prediction unit can be acquired using the method described above with reference to FIG. 9 if the picture order count of a reference picture of the corresponding block equals the picture order count of a reference picture corresponding to the current prediction unit, and the method described above with reference to FIG. 10 may not be used when the picture order count of a reference picture of the corresponding block differs from the picture order count of a reference picture corresponding to the current prediction unit.

A description will be given of order of addition of motion vector prediction values obtained through the methods described with reference to FIGS. 9 and 10 to the motion vector prediction value list of the current prediction unit.

A motion vector prediction value acquired through the method of FIG. 9 and a motion vector prediction value obtained through the method of FIG. 10 may be added to the motion vector prediction value list of the current prediction unit. A motion vector prediction value, obtained when the picture order count of a reference picture corresponding to the current prediction unit is identical to the picture order count of a reference picture of the corresponding block, can be added to the motion vector prediction value list with higher priority than a motion vector prediction value acquired when the picture order count of the reference picture corresponding to the current prediction unit is not identical to the picture order count of the reference picture of the corresponding block. For example, when the motion vector prediction value of the current prediction unit is acquired through the method of FIG. 9, the motion vector prediction value can be added to the third place of the motion vector prediction value list. When the motion vector prediction value of the current prediction unit is acquired through the method of FIG. 10, the motion vector prediction value can be added to the fifth place of the motion vector prediction value list.

As described above, the decoding/encoding apparatus to which the present invention is applied may be included in a multimedia broadcast transmission/reception apparatus such as a DMB (digital multimedia broadcast) system to be used to decode video signals, data signals and the like. In addition, the multimedia broadcast transmission/reception apparatus may include a mobile communication terminal.

The decoding/encoding method to which the present invention is applied may be implemented as a computer-executable program and stored in a computer-readable recording medium and multimedia data having a data structure according to the present invention may also be stored in a computer-readable recording medium. The computer-readable recording medium includes all kinds of storage devices storing data readable by a computer system. Examples of the computer-readable recording medium include a ROM, a RAM, a CD-ROM, a magnetic tape, a floppy disk, an optical data storage device, and a medium using a carrier wave (e.g. transmission through the Internet). In addition, a bitstream generated according to the encoding method may be stored in a computer-readable recording medium or transmitted using a wired/wireless communication network.

INDUSTRIAL APPLICABILITY

The present invention can be used to code a video signal.

The invention claimed is:

1. A method for processing a video signal by a decoding apparatus, the method comprising:
obtaining parallel processing information from the video signal, the parallel processing information indicating a size of a current parallel processing unit;
obtaining an inter-view motion vector of a current coding unit included in the current parallel processing unit using an inter-view motion vector of a neighboring block of the current parallel processing unit and the size of the current parallel processing unit, wherein the neighboring block is adjacent to the current parallel processing unit and not included in the current parallel processing unit, and wherein the current coding unit includes one or more current prediction units; and
obtaining motion vectors of the one or more current prediction units in parallel using the inter-view motion vector of the current coding unit, wherein the inter-view motion vector indicates a corresponding block of a current prediction unit, the corresponding block being positioned in a different view from a current view of the current prediction unit,
wherein obtaining the motion vectors of the one or more current prediction units in parallel includes:
generating a motion vector list for the current prediction unit, wherein a motion vector of the corresponding block is added in the motion vector list when a picture order count (POC) of a reference picture for the corresponding block in the different view is identical to a POC of a reference picture for the current prediction unit in the current view, and
wherein the motion vector of the corresponding block is not added in the motion vector list when the POC of the reference picture for the corresponding block in the different view is different from the POC of the reference picture for the current prediction unit in the current view, and
obtaining a motion vector of the current prediction unit from the motion vector list.

2. The method according to claim 1, wherein the neighboring block of the current parallel processing unit is positioned in at least one of a left-bottom parallel processing unit, a left parallel processing unit, a left-top parallel processing unit, a top parallel processing unit and a right-top parallel processing unit of the current parallel processing unit.

3. The method according to claim 1, wherein, when the current coding unit has a size of 2N×2N, each current prediction unit has a size of N×N and the current prediction units are processed in parallel, the current prediction units include a first prediction unit, a second prediction unit, a third prediction unit and a fourth prediction unit,
wherein a motion vector prediction value of the first prediction unit is acquired using motion information of a left-top block, a top block, a right-top block, a left block and a left-bottom block of the first prediction unit, a motion vector prediction value of the second prediction unit is acquired using motion information of a left-top block, a top block and a right-top block of the second prediction unit, a motion vector prediction value of the third prediction unit is acquired using motion information of a left-top block, a left block and a left-bottom block of the third prediction unit, and a motion vector prediction value of the fourth prediction unit is acquired using motion information of a right-top block and a left-bottom block of the fourth prediction unit.

4. The method according to claim 1, wherein, when the current coding unit has a size of 2N×2N, each current prediction unit has a size of N×2N and the current prediction units are processed in parallel, the current prediction units include a fifth prediction unit and a sixth prediction unit,
wherein a motion vector prediction value of the fifth prediction unit is acquired using motion information of a left-top block, a top block, a right-top block, a left block and a left-bottom block of the fifth prediction unit, and a motion vector prediction value of the sixth prediction unit is acquired using motion information of a left-top block, a top block, a right-top block and a left-bottom block of the sixth prediction unit.

5. The method according to claim 1, wherein, when the current coding unit has a size of 2N×2N, each current prediction unit has a size of 2N×N and the current prediction units are processed in parallel, the current prediction units include a seventh prediction unit and an eighth prediction unit, wherein a motion vector prediction value of the seventh prediction unit is acquired using motion information of a left-top block, a top block, a right-top block, a left block and a left-bottom block of the seventh prediction unit, and a motion vector prediction value of the eighth prediction unit is acquired using motion information of a left-top block, a right-top block, a left block and a left-bottom block of the eighth prediction unit.

6. A video decoder, comprising:

an entropy decoding unit configured to obtain parallel processing information from the video signal, the parallel processing information indicating a size of a current parallel processing unit; and an inter prediction unit configured to obtain an inter-view motion vector of a current coding unit included in the current parallel processing unit using an inter-view motion vector of a neighboring block of the current parallel processing unit and the size of the current parallel processing unit, wherein the neighboring block is adjacent to the current parallel processing unit and not included in the current parallel processing unit, and wherein the current coding unit includes one or more current prediction units, and to obtain motion vectors of the one or more current prediction units in parallel using the inter-view motion vector of the current coding unit, wherein the inter-view motion vector indicates a corresponding block of a current prediction unit, the corresponding block being positioned in a different view from a current view of the current prediction unit, wherein obtaining the motion vectors of the one or more current prediction units in parallel includes:

generating a motion vector list for a current prediction unit, wherein a motion vector of the corresponding block is in added in the motion vector list when a picture order count (POC) of a reference picture for the corresponding block in the different view is identical to a POC of a reference picture for the current prediction unit in the current view, and wherein the motion vector of the corresponding block is not added in the motion vector list when the POC of the reference picture for the corresponding block in the different view is different from the POC of the reference picture for the current prediction unit in the current view, and obtaining a motion vector of the current prediction unit from the motion vector list.

7. The video decoder according to claim 6, wherein the neighboring block of the current parallel processing unit is positioned in at least one of a left-bottom parallel processing unit, a left parallel processing unit, a left-top parallel processing unit, a top parallel processing unit and a right-top parallel processing unit of the current parallel processing unit.

8. The video decoder according to claim 6, wherein, when the current coding unit has a size of 2N×2N, each current prediction unit has a size of N×N and the current prediction units are processed in parallel, the current prediction units include a first prediction unit, a second prediction unit, a third prediction unit and a fourth prediction unit, wherein the inter prediction unit acquires a motion vector prediction value of the first prediction unit using motion information of a left-top block, a top block, a right-top block, a left block and a left-bottom block of the first prediction unit, acquires a motion vector prediction value of the second prediction unit using motion information of a left-top block, a top block and a right-top block of the second prediction unit, acquires a motion vector prediction value of the third prediction unit using motion information of a left-top block, a left block and a left-bottom block of the third prediction unit, and acquires a motion vector prediction value of the fourth prediction unit using motion information of a right-top block and a left-bottom block of the fourth prediction unit.

9. The video decoder according to claim 6, wherein, when the current coding unit has a size of 2N×2N, each current prediction unit has a size of N×2N and the current prediction units are processed in parallel, the current prediction units include a fifth prediction unit and a sixth prediction unit, wherein the inter prediction unit acquires a motion vector prediction value of the fifth prediction unit using motion information of a left-top block, a top block, a right-top block, a left block and a left-bottom block of the fifth prediction unit and acquires a motion vector prediction value of the sixth prediction unit using motion information of a left-top block, a top block, a right-top block and a left-bottom block of the sixth prediction unit.

10. The video decoder according to claim 6, wherein, when the current coding unit has a size of 2N×2N, each current prediction unit has a size of 2N×N and the current prediction units are processed in parallel, the current prediction units include a seventh prediction unit and an eighth prediction unit, wherein the inter prediction unit acquires a motion vector prediction value of the seventh prediction unit using motion information of a left-top block, a top block, a right-top block, a left block and a left-bottom block of the seventh prediction unit and acquires a motion vector prediction value of the eighth prediction unit using motion information of a left-top block, a right-top block, a left block and a left-bottom block of the eighth prediction unit.

11. The method according to claim 1, wherein a POC indicates a picture output order when video is output.

12. The video decoder according to claim 6, wherein a POC indicates a picture output order when video is output.

* * * * *